United States Patent [19]
Saiz

[11] Patent Number: 5,784,978
[45] Date of Patent: Jul. 28, 1998

[54] WIND ENERGY CATCHMENT DEVICE

[76] Inventor: Manuel Munoz Saiz, San Emilio No. 16, 1-3, 28017 Madrid, Spain

[21] Appl. No.: 646,874

[22] Filed: May 8, 1996

[30] Foreign Application Priority Data

Feb. 5, 1996 [ES] Spain .................................. P9600263
Mar. 11, 1996 [ES] Spain .................................. P9600578

[51] Int. Cl.[6] .............................. B63H 9/04; B63H 1/06
[52] U.S. Cl. .................................... 114/103; 416/132 R
[58] Field of Search ........................ 416/132 R, 132 A, 416/132 B, 142, 150; 114/103

[56] References Cited

U.S. PATENT DOCUMENTS

19,383  2/1858  Shaw ................................... 416/132 B

*Primary Examiner*—Jesus D. Sotelo
*Attorney, Agent, or Firm*—Robert M. Schwartz; Loren D. Pearson; Robert M. Schwartz, P.A.

[57]  ABSTRACT

This invention is a wind energy catchment system using a central vertical shaft, the bottom end of which rotates and is secured to a rigid support fixed to the ground. The lower part of the shaft has radial arms secured to it, evenly spaced one from the other. The upper end of the shaft and the outer ends of the radial arms are all connected by cables or cords. The cables between the ends of the radial arms define a regular polygon; between it and the upper end of the shaft and the outside end of each radial arm and around the shaft, there are triangular, dihedral or trihedral sails all formed by triangular surfaces secured at their vertices. In all cases, the furthest external side of these sails is arranged between the top end of the shaft and the furthest external end of the associated arm, while the lower edge runs between the end of each arm and one or more points on the surface on the same plane as the radial arms. The bottom inside vertex of the triangular sails is secured to an intermediate point on the adjacent arm immediately ahead of it in the direction of rotation.

10 Claims, 6 Drawing Sheets

WIND ENERGY CATCHMENT DEVICE

BACKGROUND OF THE INVENTION

1. Field of the Invention

This invention refers to a device for capturing wind energy, of the type that rotates on a horizontal plane around a vertical shaft, using wind-driven sail surfaces that are reoriented cyclically as the device turns, and refers to wind catchment units that principally generate electrical power and are of the large-scale type, using wind power in a centralized and commercial form.

2. State of the Prior Art

Current energy systems pollute if they use fossil fuels and are extremely radioactive if nuclear fuels are used. On the other hand, existing wind catchment systems require advanced technology, high costs, location on elevated sites and high winds to ensure high performance, and depend on wind conditions that are difficult to obtain, such as 25–50 km/h, still less on a constant heading. Such sites are not easily found. These facilities are difficult to control, complex, costly or impractical, and the energy proves more expensive than with conventional systems, while killing birds and generating a high environmental impact. They require systems for direction into the wind, and high technology.

BRIEF DESCRIPTION OF THE INVENTION

This invention is a wind energy catchment system using a central vertical shaft, the bottom end of which rotates and is secured to a rigid support fixed to the ground. The lower part of the shaft has radial arms secured to it, evenly spaced one from the other. The upper end of the shaft and the outer ends of the radial arms are all connected by cables or cords. The cables between the ends of the radial arms define a regular polygon; between it and the upper end of the shaft and the outside end of each radial arm and around the shaft, there are triangular, dihedral or trihedral sails all formed by triangular surfaces secured at their vertices. In all cases, the furthest external side of these sails is arranged between the top end of the shaft and the furthest external end of the associated arm, while the lower edge runs between the end of each arm and one or more points on the surface on the same plane as the radial arms. The bottom inside vertex of the triangular sails is secured to an intermediate point on the adjacent arm immediately ahead of it in the direction of rotation.

Some improvements refer to wind power catchment devices comprising a rigid vertical shaft secured to the ground, which carries a rotary collar on each end. At the bottom, and arranged concentrically around the shaft, there is a large hoop formed by a cable, and connected from a number of equidistant points on it, by cables, to the two collars. Between the hoop and collars, there are two or more triangular or dihedral sails, evenly spaced, with one vertex connected to the upper collar, and the outside bottom vertex connected to the hoop by a small cable, while the inside bottom vertex, and in the case of the dihedral sails, the bottom point of the vertex of the dihedral angle, is connected to a point on the cables between the hoop and the bottom collar. The hoop is secured by a set of pulleys, fixed radially with the appropriate support to the ground, and is stayed. The bottom collar is concentrically connected to a small plate on whose lower edge there is a gear wheel for transmission of the movement.

In one variant, the bottom outside vertex of the sails has a rigid angular or curved element making it possible to secure the hoop on its outside, carrying the pulleys on the inside of the hoop and also moored to the ground.

Instead of the collars, there can be a rotary outer shaft covering the whole length of the shaft concentrically and with the same function as the collars.

The cable or hoop can be covered by rings to protect it from friction and maintain its flexibility.

The sails may be the valve type, wholly or in part, formed by multiple rotary rectangular sails on one said, supported on a mesh.

The set of sails creates a rotation torque, at all times, due to the action of the wind.

Two systems are presented for protection of the devices gathering the sails: one is to release the top collar to allow them to drop onto a mesh on the same plane as the hoop or radial arms, while the other rolls the sails around the shaft. This takes place automatically by the operation of release pawls when the wind reaches a high level against the sails, or by means of an electromagnet or electric motor driven by the displacement of blades when the wind reaches a certain speed.

In a variant, the rigid hoop or ring is moored to the ground with the outside vertex of the sails each securing or carrying a pulley which is supported and slips on the outside of the ring. Two rings are close together, and a double pulley can also be used.

In a variant, the shaft or turret is fixed to the ground and carries a rotary collar on each end. This allows to reduce the moving parts of the structure and its weight. The shaft and radial arms can be formed by two or more cylindrical tubes of different size whose ends are cylindrical and pass within one another allowing portability and an easier transport.

On the dihedral sails the inside bottom vertex is secured to an intermediate point on the adjacent arm immediately ahead of it in the direction of rotation, with the bottom end of the dihedral angle secured to an intermediate point on the next side ahead in the direction of rotation of the polygon formed by the ends of the radial arms; in a variant, the inside vertex is attached to a point close to the bottom end of the shaft. The dihedral angle is defined by a cable or cord running through it and fixed at its ends.

The trihedral sails are similar to their dihedral counterparts and are secured in the same way, though with the addition of the lower triangular surface equal to the projection of the dihedron over the horizontal surface on the same plane as the radial arms.

A laminar surface can be added to the triangular sails on the same plane as the polygon between the ends of the radial arms.

The sails act as radial vanes or blades.

As a whole, the layout of the catchment device is such that the shaft is its axis or symmetry.

The top end of the shaft can be secured to the ground by cables or stays.

The sails may be formed by meshes and strips or rotary sails around one of the upper sides, at a 30° angle to the horizontal, and ahead of the mesh in the direction of rotation. They operate as valves, while the strips or fabrics of the side receiving the air on the side of the mesh furthest from the wind create blockage and, therefore, maximum resistance, which is less on the opposite side, where the wind strikes the strips or fabrics on the side where the mesh is further ahead in relation to the wind.

One or both of the lower vertices can be secured by cords or cables of reduced cross-section, which will break under excessively strong winds or gusts. During rotation, the wind catchment device is divided in relation to the incident wind into two halves: on one, the sails offer maximum resistance, while this is minimal on the other half, thus causing and providing a high rotation torque. This is done cyclically on each sail as it rotates, enhancing the device's performance. The catchment device's performance can be enhanced by making the cables or cords connecting the two lower vertices longer. If the cable or cord holding the top vertex of the sail is lengthened, the value of the upward component of the sail is reduced.

The top end of the shaft can be fitted with small arms to provide trapeziform sails along with the lower arms.

The dihedral or trihedral sails are also formed by two or three triangular sails.

The catchment assembly should preferably be green.

This catch device, which eliminates many of the problems described above, provides a potent, cost-effective energy source independently of optimal wind conditions, it does not require optimal siting, nor does it have to be placed on very high ground. It does not require highly specialized personnel or techniques, whether constructed on a large or small scale. It is safe. It operates with winds from all directions. It is easy and cheap to repair, fit and dismantle. It is easily transported. It does not require a large structure. It can be made easily and economically. It self-protects against excessive wind. Economical power generators can be used. It captures a large amount of energy. It does not require a large part of the energy to run its own mechanisms. The sails are very cheap as is their replacement. It is generally installed on the ground. Per-KW cost is very low. High performance. The sails are not noisy. It does not generate an environmental impact, simulating large trees. It provides the largest existing catchment surface. Expensive steering mechanisms are not required. By using low-intensity winds, it has a longer annual period of use and allows for a larger number of usable zones. It is simpler and more economical. The generator and mechanisms are at the bottom. The complex steering system is not required. It can be used with winds from any direction. It does not kill birds or pollute.

The hoop type device allows greater catchment area and so the greatest power of all the devices or catchment systems known and possible, thanks to the absence of large moving parts except for cables and sails, which can be made to extremely large dimensions.

It allows an easier transport.

BRIEF DESCRIPTION OF THE DRAWINGS

FIG. 1' shows a perspective view of the device of the improvement of the invention.

FIG. 2' shows a top view of the lower edge of the sails of the improvement of the invention.

FIG. 3' shows a top view of the bottom edge of the sails of a variant of the improvement of the invention.

FIGS. 4', 5', 6', and 7' show a front view of different systems of securing a surrounded hoop.

FIG. 8' shows a perspective view of another variant of securing the hoop.

FIGS. 9' and 10' show a top view of two systems for gust protection.

DESCRIPTION OF THE PREFERRED EMBODIMENT

Figure 1:
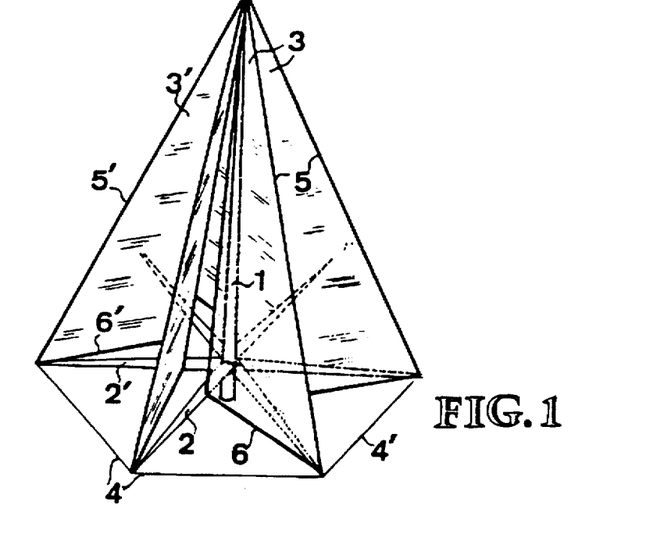
FIG. 1 shows a perspective view of the wind energy catchment.

FIG. 1 refers to a wind energy catchment device using six triangular radial arms or sails, it consists of the shaft 1, the radial arms 2 and 2', the sails 3 and 3', and the cables 4 and 4', which connect the more outer ends to the radial arms, and the cables 5 and 5' which connect the more outer ends of the arms to the upper end of the shaft.

Figure 2:
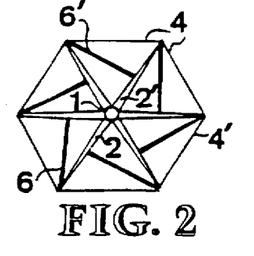
FIGS. 2 to 10 show top views of the projection or lower edge of the sails of different type of wind energy catchment devices, depending on their number of arms or sails.

FIG. 2 refers to the wind energy catchment device of the FIG. 1, and consists of the shaft 1, the radial arms 2, the cables 4 and 4' which connect the ends of the arms, and the lower edges 6 and 6' of the sails.

Figure 3:
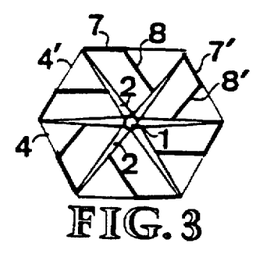

FIG. 3, consists of the shaft 1, the radial arms 2, the cables 4 and 4', which connect the outer ends arms to the lower edges 7 and 8, and 7' and 8' of the dihedral sails drawn with thick or wide lines, where the top of the shaft coincides with the upper vertex of all lines, where the top of the shaft coincides with the upper vertex of all said dihedral sails. This generates a torque as the device in FIG. 1 or 2.

Figure 4:
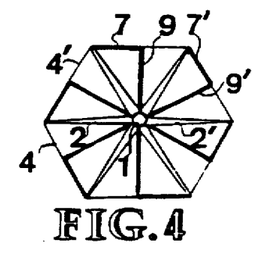

FIG. 4, consists of the shaft 1, the radial arms 2, the cables 4 and 4' connecting the outer ends arms to the lower edges 7 and 9, and 7' and 9', of the dihedral sails, which are variants of the dihedral sails used in FIG. 3. It refers to a wind energy catchment device using six radial arms or dihedral sails.

Figure 5:
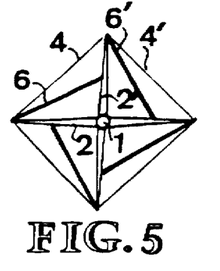
Figure 8:
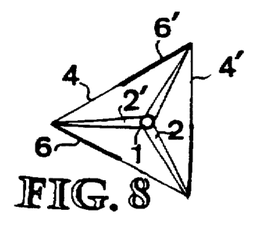

Everything relative to FIG. 1 can be applied to FIGS. 5 and 8, but taking into account that they refer to wind energy catchment devices of 4 or 3 radial arms or sails respectively.

Figure 6:
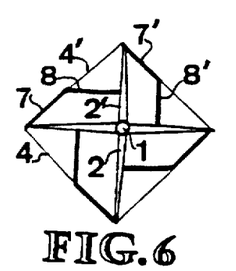
Figure 9:
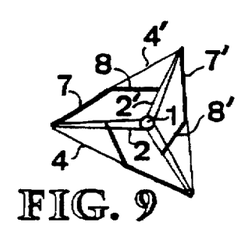

Everything relative to FIG. 3 can be applied to FIGS. 6 and 9, but taking into account that they refer to wind energy catchment devices of 4 or 3 radial arms or sails respectively.

Figure 7:
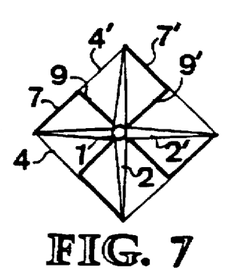
Figure 10:
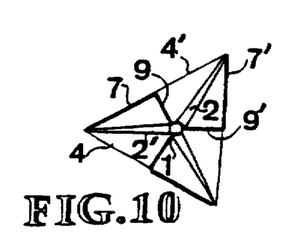

Everything relative to FIG. 4 can be applied to FIGS. 7 and 10, but taking into account that they refer to wind energy catchment devices of 4 or 3 radial arms or sails respectively.

The trihedral wind energy catchment devices are similar to the ones shown previously but are added clothes or plates equal and on the place of the triangles formed among the lower edges of the dihedron or thick or wide line.

Figures 11, 12, 13:
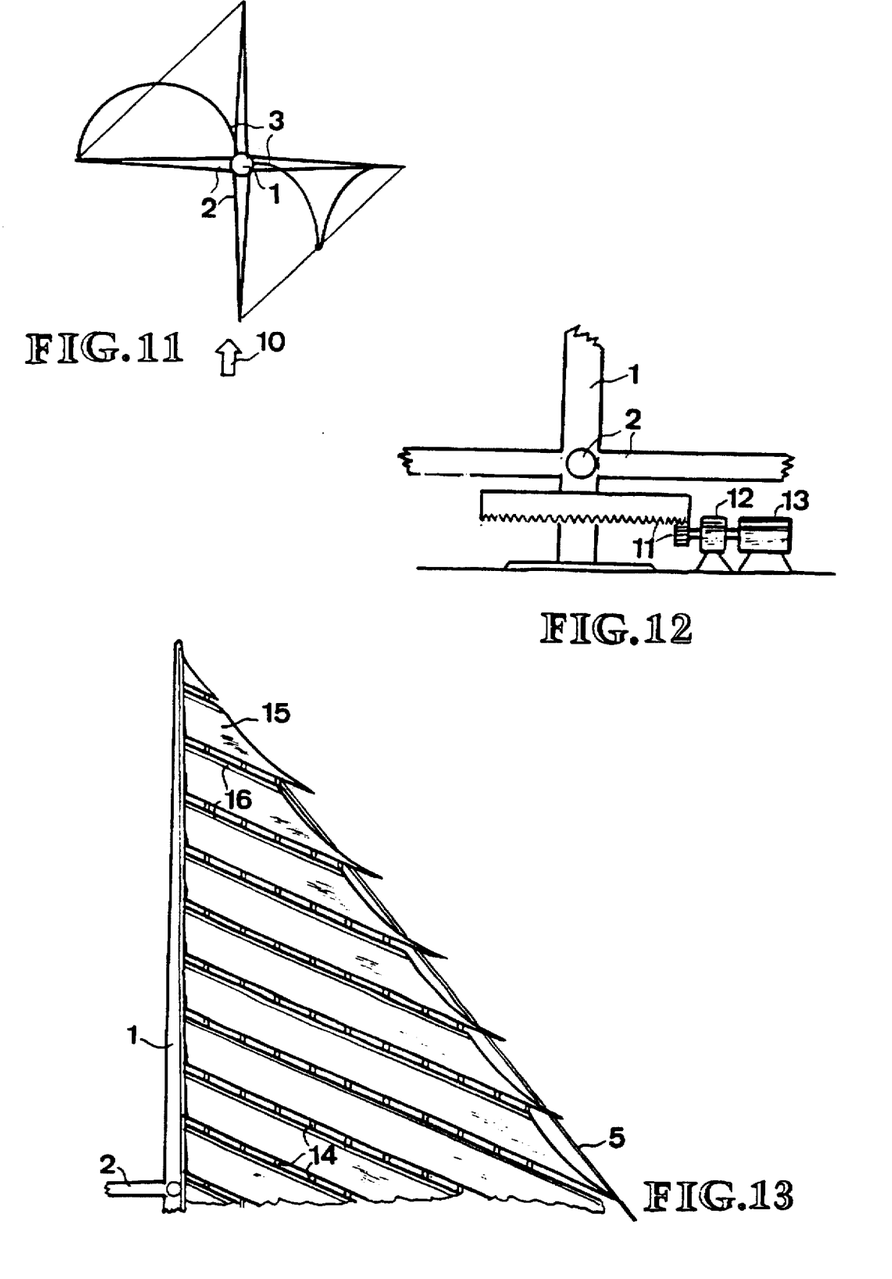
FIG. 11 shows a top view of the lower edge of the sails of the wind energy catchment device during its operation.
FIG. 12 shows a front view of the connection of the wind energy catchment device to the electrical generator.
FIG. 13 shows a front view of a part of the multivalve type sail.

FIG. 11, consists of the shaft 1, the radial arms 2, and the wind direction 10. And it shows practically the behavior of the sails 3.

FIG. 12, consists of the shaft 1, the radial arms 2, the gears 11, the revolutions per minute multiplyer 12 and the electro generator 13.

FIG. 13, consists of the shaft 1, the radial arms 2, the cable 5, the mesh 14 and the rotating sails 15 around the upper tilted edge 16.

The high wind protection can be performed automatically by the gradual loosening of the cables that connect the ends of the radial arms rolling the sails around the shaft when the wind increases excessively.

Figure 14:
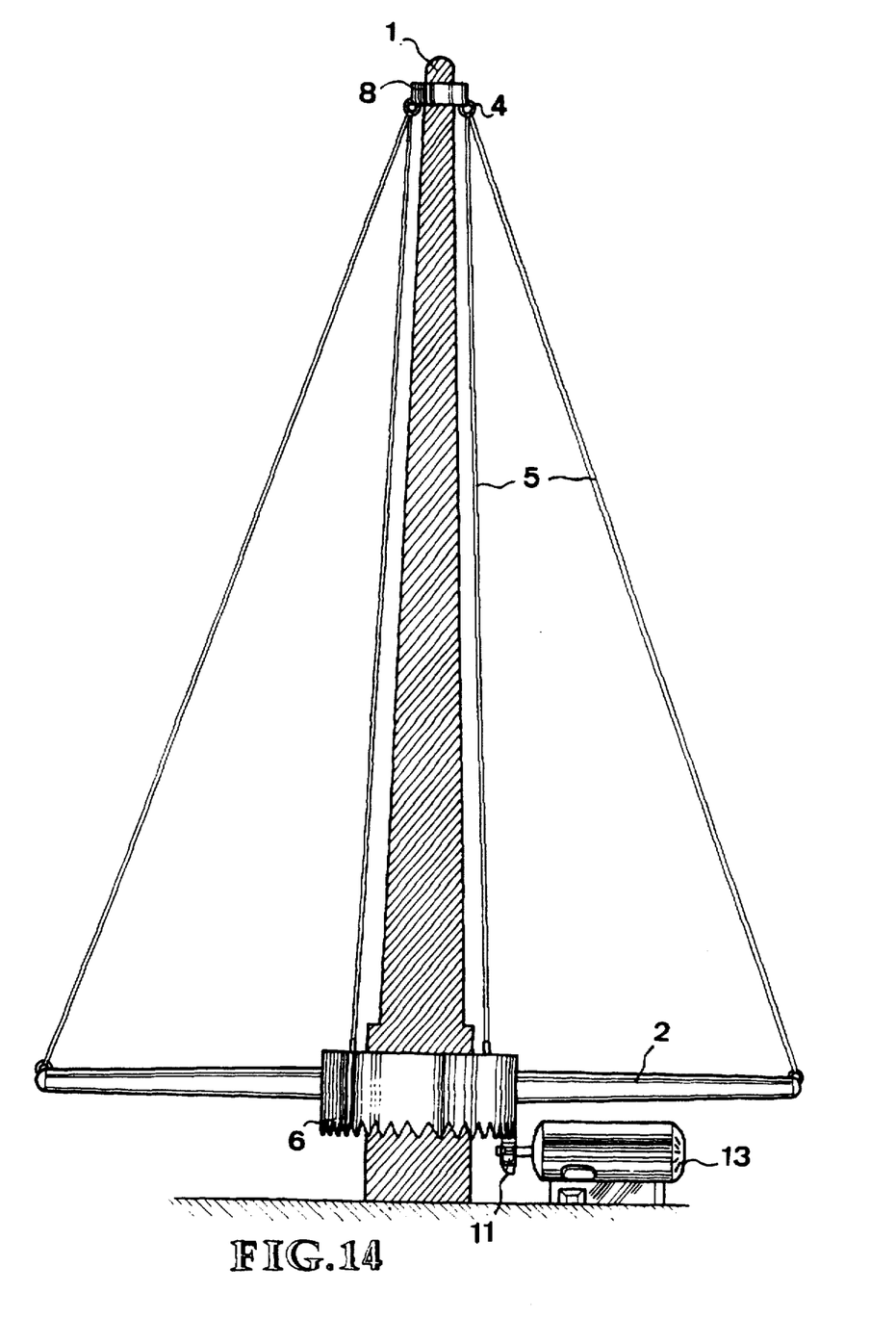
FIG. 14 shows a front view of the rigid shaft variant.

FIG. 14 consists of the shaft 1, the radial arms 2, the flange lings 17, the cables 5, the upper collar 19, the bottom collar 6, the gear 11 and the electro-generator 13.

Figure 15:
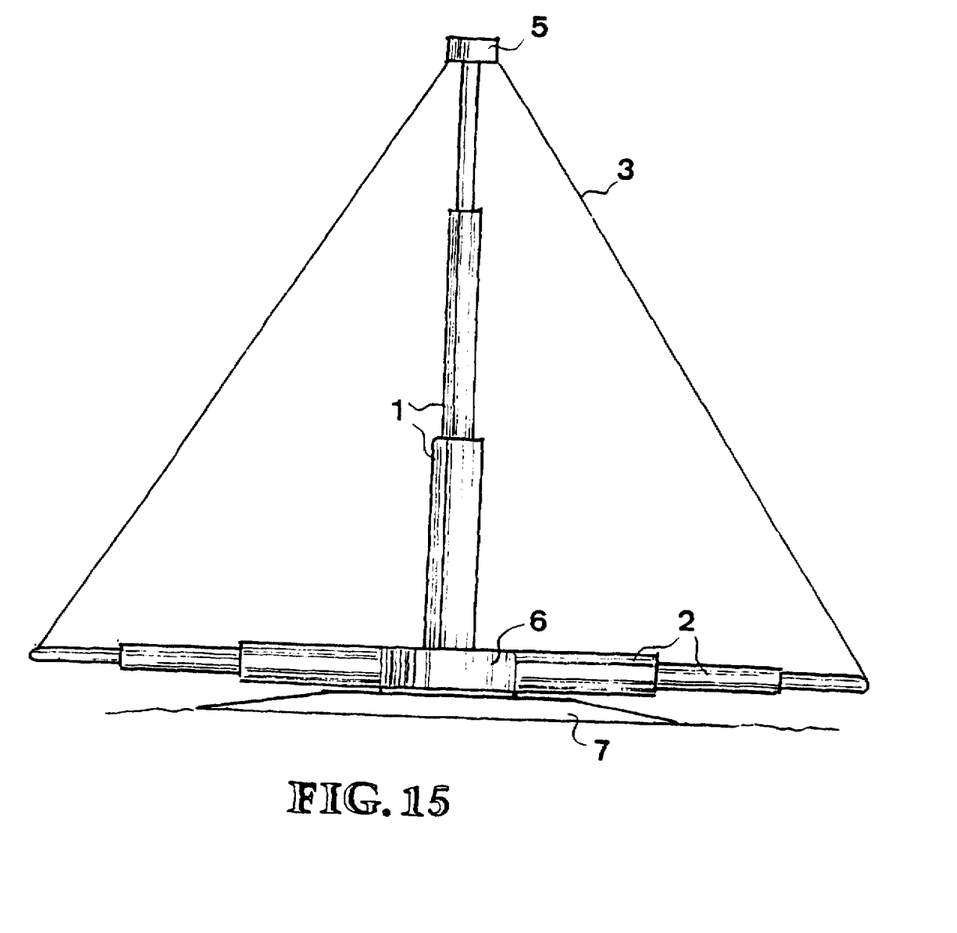
FIG. 15 shows a front view of another rigid shaft variant.

FIG. 15, consists of the tubes of the shaft 1, the tubes of the radial arms 2, the cable 3, the upper collar 19, the bottom collar 18 and the support part 20.

FIG. 1' consists of the vertical shaft 1, the triangle sails 3 and 3', the securing devices 21 and 21', the upper collar 19, the lower collar 18, the cables 22 and 22' and the surrounded hoop 23.

FIG. 2', consists of the shaft 1, the lower edge of the sails 3 and 3', the cables 22 and 22' and the hoop 23.

FIG. 3', consists of the shaft 1, the lower edges of the dihedral sails 3 and 3', the cables 22 and 22' and the hoop 23.

FIG. 4' consists of the sail 3, the hoop 23, the roller or pulleys 24 and 24', the cable of connecting the hoop to the sail 25 and the moored support to the ground 26.

FIG. 5', consists of the sail 3, the hoop 23, the pulley 24, the cable of connecting the hoop and the sail 25 and the moored support to the ground 26.

FIG. 6' consists of the sail 3, the hoop 23, the pulley 24, the cable of connecting the hoop and the sail 25, and the moored support to the ground 26.

FIG. 7' consists of the sail 3, the hoop 23, the pulley 24, the support part 26 and the angular rigid element of sliding and securing the sail to the hoop 27.

FIG. 8' consists of the sail 3, the hoop, 23, the pulley 24, the rigid angular and sliding element to secure the sail to the hoop 27, and the rings 28.

FIG. 9', consists of the shaft 1, the retracted sails 3 and 3', the upper collar 19, the bottom plate 18 and the mesh inner and in the same plane with the hoop 29.

FIG. 10', consists of the shaft 1, the arms 2 and 2', the partly rolled up and retracted 3 and 3' and the rotating collar 18.

What is claimed is:

1. Wind energy catchment device, comprising a rigid vertical shaft secured to the ground carrying a rotary collar on each end, a large hoop formed by a cable connected from a number of equidistant points on it by cables to said collars between said hoop and said collars; a plurality of dihedral sails that are evenly spaced with one vertex connected to the upper collar, and the outside bottom vertex connected to the hoop by a small cable, the bottom point of the vertex of the dihedral angle, connected to a point on the cables between the hoop and the bottom collar, wherein said hoop is secured by a set of pulleys, fixed radially with the appropriate support to the ground, and said bottom collar concentrically connected to a small plate on which a gear wheel for transmission of the movement is located.

2. A wind energy catchment device, comprising:
a central vertical shaft, wherein said shaft rotates and is secured to a rigid support fixed to the ground,
a plurality of radial arms secured to the lower part of said shaft, wherein said radial arms are evenly spaced from each other,
a number of cables,
   wherein said number of cables equals the number of radial arms, and
   wherein one of said cables connects the outer ends of each radial arms to the upper end of said shaft, and
   a number of triangular sails,
   wherein said number of sails equals the number of radial arms, and
   wherein each of said triangular sails is connected by its three corners:
      the first corner is connected to said upper end of said shaft,
      the second corner is connected to said outer end of said radial arms, and
      the third corner is connected to an intermediate point on the adjacent radial arm that is previous in the direction of rotation, wherein said intermediate point is between said shaft and the outer end of said adjacent radial arm; and
wherein said sails are dihedral, having the lower end vertex of the dihedral angle secured to an intermediate point on the next side ahead on the direction of rotation of a polygon and the inside vertex attached to a point close to the bottom end of the shaft, wherein said polygon is formed by cables that connect the ends of adjacent radial arms.

3. Wind energy catchment device as set forth in claim 2, wherein the sail surfaces are trihedral formed by the triangle surfaces, adding to the dihedral sails the lower triangular surface which is equal to the projection of said dihedral sails over the horizontal surface on the same plane as the radial arms.

4. A wind energy catchment device, comprising:
a central vertical shaft, wherein said shaft is fixed to the ground and carries a rotary collar on each end,
a plurality of radial arms secured to the lower part of said shaft, wherein said radial arms are evenly spaced from each other, and
a number of cables,
   wherein said number of cables equals the number of radial arms, and
   wherein one of said cables connects the outer ends of each radial arms to the upper end of said shaft, and
   a number of triangular sails,
   wherein said number of sails equals the number of radial arms, and
   wherein each of said triangular sails is connected by its three corners:
      the first corner is connected said upper end of said shaft,
      the second corner is connected to said outer outside end of said radial arms, and
      the third corner is connected to an intermediate point on the adjacent radial arm that is previous in the direction of rotation, wherein said intermediate point is between said shaft and the outer end of said adjacent radial arm.

5. A wind energy catchment device, comprising:
a central vertical shaft,
   wherein the bottom of said shaft rotates and is secured to a rigid support fixed to the ground, and
   wherein the shaft is formed by a plurality of cylindrical tubes whose ends are cylindrical and pass within one another,
a plurality of radial arms secured to the lower part of said shaft,
   wherein said radial arms are evenly spaced from each other, and
   wherein said radial arms are formed by a plurality of cylindrical tubes whose ends are cylindrical and pass within one another,
a number of cables wherein said number of cables equals the number of radial arms and wherein one of said cables connects the outer ends of each radial arms to the upper end of said shaft, and
a number of triangular sails wherein said number of sails equals the number of radial arms, and wherein each of said triangular sails is connected by its three corners:
   the first corner is connected said upper end of said shaft,
   the second corner is connected to said outer end of said radial arms, and the third corner is connected to an intermediate point on the adjacent radial arm that is previous in the direction of rotation, wherein said intermediate point is between said shaft and the outer end of said adjacent radial arm.

6. A wind energy catchment device comprising:

a vertical shaft secured to the ground, an upper rotary collar located on the upper end of said shaft that rotates around said shaft, a lower rotary collar located on the lower end of said shaft that rotates around said shaft, a hoop that is located in the same plane as said lower rotary collar and that is concentric with said lower rotary collar, wherein said hoop has a plurality of points on its circumference, wherein each of said points is equidistantly spaced, and wherein each of said points has two adjacent points on said hoop, one adjacent point in one direction and the other adjacent point in the other direction, and wherein each of said points is connected by a lower cable that runs from its respective point on the hoop to the bottom collar, wherein each of said points is connected by an upper cable that runs from its respective point on the hoop to the upper collar, wherein each of said points has a respective triangular sail wherein said triangular sails is connected at each of its vertexes:

the first of said vertexes is attached to said upper collar, and the second of said vertexes is attached to the lower cable between said lower collar and said hoop, and the third of said vertexes is connected to the lower cable of an adjacent point and all of said adjacent points are in the same direction relative to each other;

a set of pulleys fixed radially with support to the ground, and a gear wheel located on the lower edge of said bottom collar that translates movement.

7. Wind energy catchment device as set forth in claim 6, wherein the bottom-outside vertex of the sails has a rigid angular element making it possible to secure the hoop on its outside, carrying the pulleys on the inside of the hoop where the pulleys are moored to the ground.

8. Wind energy catchment device as set forth in claim 6, wherein the bottom outside vertex of the sails have a curved element making it possible to secure the hoop on its outside, carrying the pulleys on the inside of the hoop where the pulleys are moored to the ground.

9. Wind energy catchment device as set forth in claim 6, wherein the hoop is held by a plurality of c-shaped members wherein said c-shaped members are attached to the ground, and wherein said c-shaped members have an opening through which he lower cable can run.

10. A wind energy catchment device, comprising:

a central vertical shaft, the bottom of said shaft rotates and is secured to a rigid support fixed to the ground, a plurality of radial arms secured to the lower part of said shaft, wherein said radial arms are evenly spaced from each other, a number of cables wherein said number of cables equals the number of radial arms, and wherein one of said cables connects the outer ends of each radial arms to the upper end of said shaft, and a number of triangular sails wherein said number of sails equals the number of radial arms, and wherein each of said triangular sails is connected by its three corners:

the first corner is connected to said upper end of said shaft, the second corner is connected to said outer end of said radial arms, and the third corner is connected to an intermediate point on the adjacent radial arm that is previous in the direction of rotation, wherein said intermediate point is between said shaft and the outer end of said adjacent radial arm;

wherein said triangular sails are made of mesh capable of allowing wind to flow through said mesh in either direction, a plurality of upper sides that decline from the shaft at a thirty-degree angle that lie in the same plane as corresponding triangular sails, and a plurality of rotary sails that mount underneath said upper sides that can rotate on said upper sides allowing said rotary sails t have a range of positions from vertical against said mesh, triangular sails, to horizontal, perpendicular to said mesh, triangular sails.

* * * * *